J. W. COOMBS.
RIVET SLITTING MACHINE.
APPLICATION FILED JULY 12, 1915.

1,218,746.

Patented Mar. 13, 1917.
4 SHEETS—SHEET 1.

INVENTOR
James W. Coombs
BY
ATTORNEY.

J. W. COOMBS.
RIVET SLITTING MACHINE.
APPLICATION FILED JULY 12, 1915.

1,218,746.

Patented Mar. 13, 1917.
4 SHEETS—SHEET 3.

INVENTOR
James W. Coombs
BY
ATTORNEY.

J. W. COOMBS.
RIVET SLITTING MACHINE.
APPLICATION FILED JULY 12, 1915.

1,218,746.

Patented Mar. 13, 1917.
4 SHEETS—SHEET 4.

INVENTOR
James W. Coombs
BY
ATTORNEY.

UNITED STATES PATENT OFFICE.

JAMES W. COOMBS, OF PHILADELPHIA, PENNSYLVANIA, ASSIGNOR TO PENN RIVET CORPORATION, OF PHILADELPHIA, PENNSYLVANIA, A CORPORATION OF VIRGINIA.

RIVET-SLITTING MACHINE.

1,218,746.　　　　　Specification of Letters Patent.　　Patented Mar. 13, 1917.

Application filed July 12, 1915. Serial No. 39,231.

*To all whom it may concern:*

Be it known that I, JAMES W. COOMBS, a citizen of the United States, residing at Philadelphia, county of Philadelphia, and State of Pennsylvania, have invented an Improvement in Rivet-Slitting Machines, of which the following description, in connection with the accompanying drawings, is a specification, like letters on the drawings representing like parts.

The invention to be hereinafter described relates to machines for slotting or forming a slit in the ends of metal rivets.

As well known by those skilled in the art, rivets are often employed in certain processes, with a split or slot formed at one end, in order that they may be more readily upset or clenched over the materials which it is intended to fasten together.

In machines of the above general type, it is essential that rivets to be split or slotted shall be supplied to the slotting or slitting mechanism in successive order, and that after the slotting or slitting process has been carried into effect, the rivet and the scrap incident to the formation of the slot shall be directed into separate receptacles.

One of the important features of the present invention consists in the means for supplying rivets to the slitting or slotting mechanism, whereby their presentation to such mechanism may be rapidly and effectually performed with the necessary accuracy for the production of an economic product. A further important feature of the invention consists in a rivet holder formed of a plurality of relatively movable parts and adapted to receive individual rivets successively from a source of supply and present them to a transferrer which thereupon delivers them to the slitting or slotting mechanism.

A still further feature of the invention consists in the construction of the transferrer whereby it is enabled to grasp a rivet presented to it by the rivet holder, carry the rivet from the holder into coöperative relation with means for directing the rivet to the slitting or slotting mechanism. Other important features of the invention, such for instance, as the means for controlling the individual supply of the rivets to the rivet holder, will hereinafter be described with particular reference to the accompanying drawings wherein one good, practical form of means is shown for carrying the various features of the present invention into effect, it being understood that the invention in its true scope is defined by the appended claims.

Figure 1:
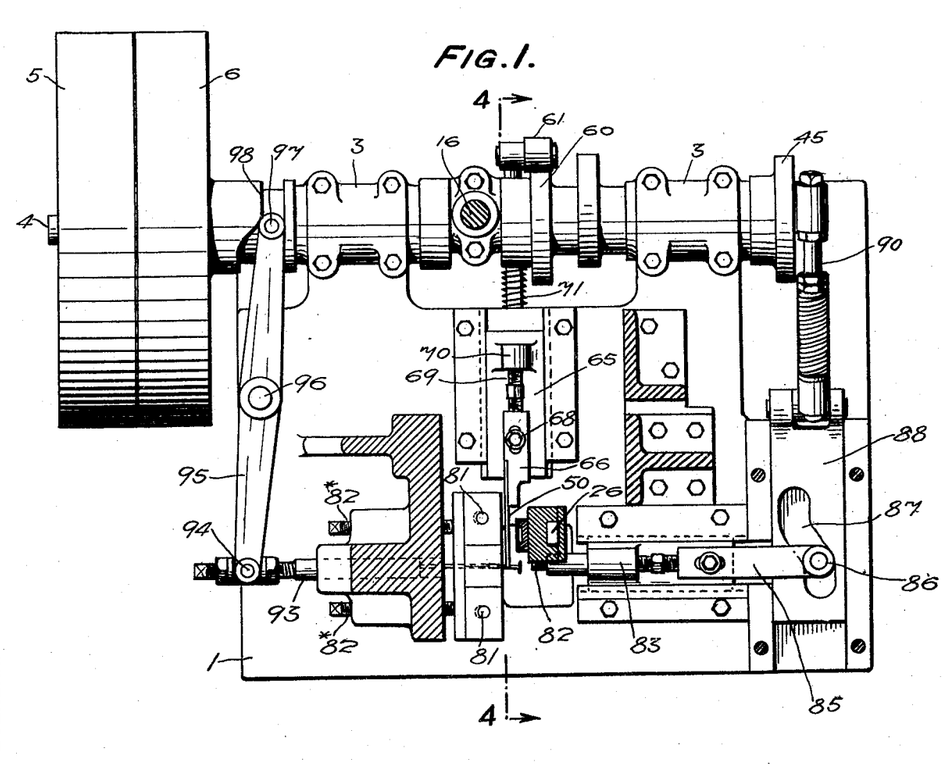
Figure 1 is a sectional plan view of a rivet slitting machine embodying the present invention.

The machine frame for supporting the operating parts may be of any desired character, and in the present instance is shown as a table 1 mounted upon suitable supporting legs 2. Mounted in suitable bearings 3, Fig. 1, on the machine frame, is the main driving shaft 4 carrying the fast and loose pulleys 5 and 6 which may be operated from any suitable source of power by belting connection.

Figure 2:
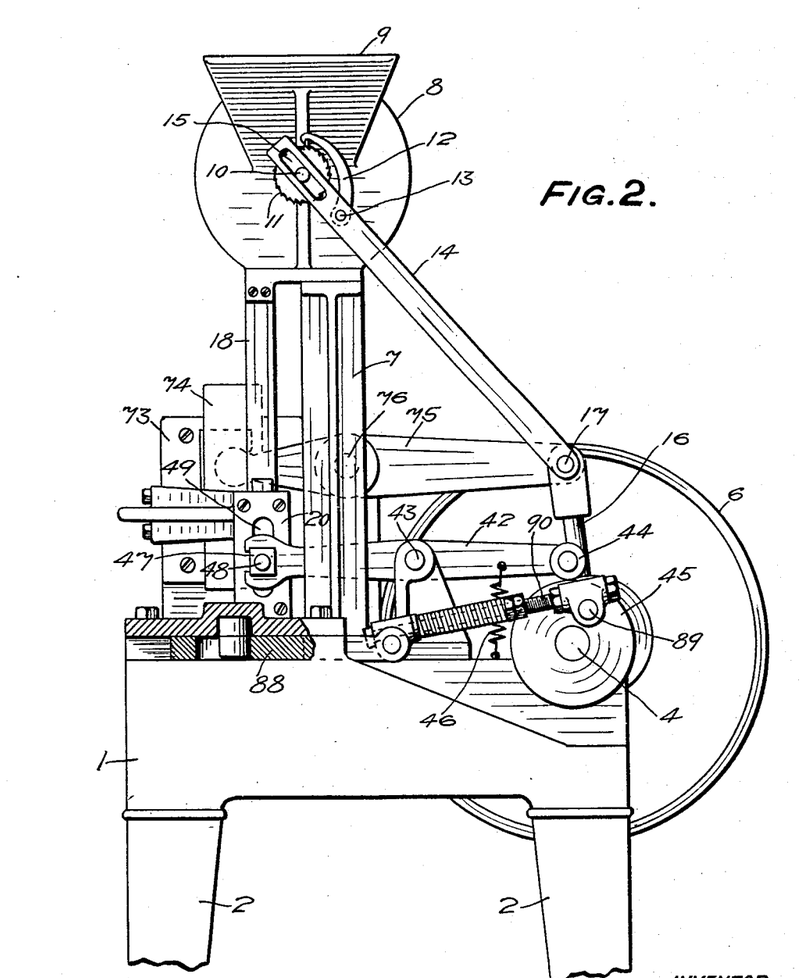
Fig. 2 is an end elevation of the machine indicated in Fig. 1, some of the parts being broken away to disclose other parts beyond.

Rising from the machine frame or table 1 is the bracket 7 for supporting the rivet supplying means. The rivet supplying means may be of any suitable character, but in the present instance is shown as comprising a hopper 8 into which the rivets may be directed through a suitable chute 9 and be delivered therefrom in any usual manner. In the present instance, the hopper 8 or magazine, as it may be called, will preferably be provided with the usual rotating rivet stirrer mounted on the shaft 10. In order to give proper rotary movement to the stirrer, the shaft 10, Fig. 2, may be provided with the ratchet wheel 11 adapted to be operated by a pawl 12 pivotally connected at 13 to an actuator 14 which, as indicated in Fig. 2, comprises a rod, one end of which is slotted as at 15, to engage the projecting end of the shaft 10, and the other end of which may be reciprocated from the main shaft in any suitable manner, as for instance by the arm 16 rising from an eccentric strap and actuated by a suitable eccentric on the main driving shaft 4. The arm 14 may be pivotally connected to the arm 16 as at 17, the construction being such as will more fully appear, to give reciprocating movement to the rod 14, as will be clearly understood.

Figure 3:
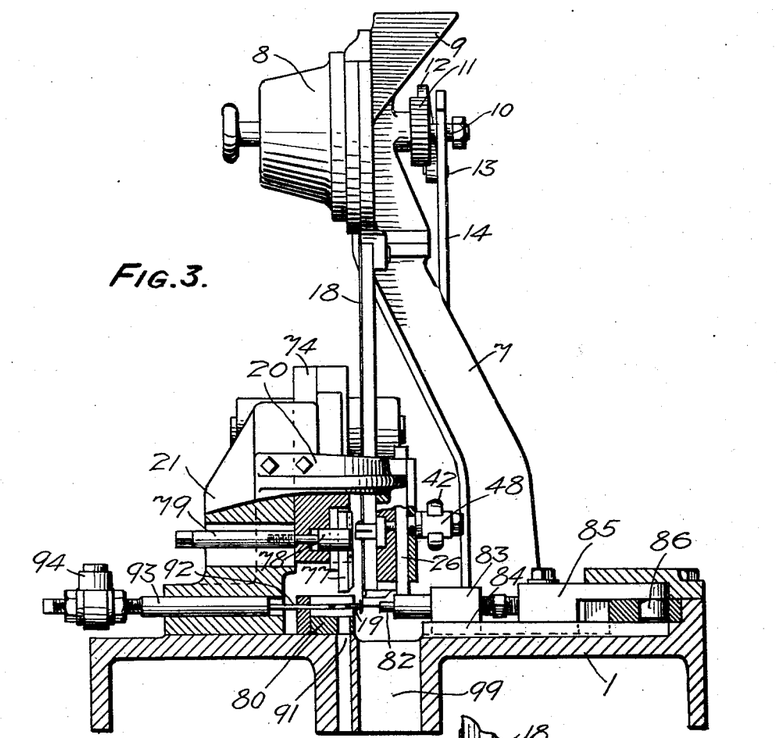
Fig. 3 is a front elevation of the machine with some of the parts being shown in section, and others broken away.
Figure 4:
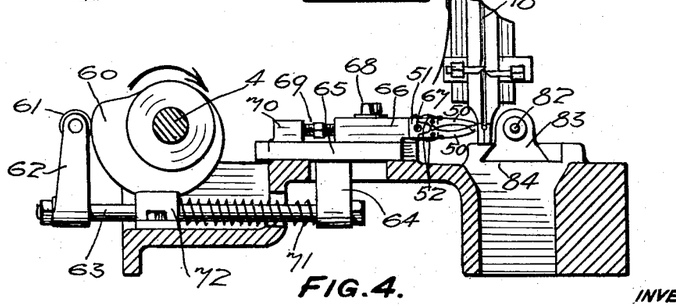
Fig. 4 is a section on the line 4—4, Fig. 1.
Figures 5, 6:
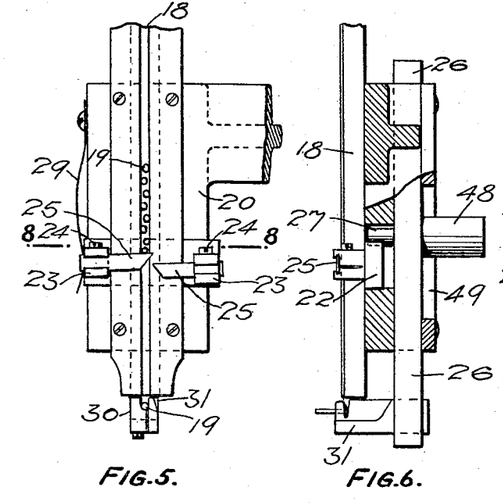
Fig. 5 is a face view of the raceway and the rivet separating and rivet holding device.
Fig. 6 is a side elevation of the parts shown by Fig. 5, portions thereof being shown in section and others being broken away.

Leading from the hopper or magazine 8 is a chute or raceway 18, Figs. 3, 4 and 5, through which the rivets 19 pass in single line formation and from which they are permitted to pass singly to the rivet holder, as will presently appear. The chute or raceway 18 may be conveniently supported in any suitable manner from the machine frame, and in the present illustration of the invention is shown as connected to the lower part of the hopper at one end and to an arm 20 projecting from the bracket 21 rising from the machine frame. The general arrangement and association of the parts so far described may be varied, as the detail constructions thereof form no essential part of the present invention.

In order that rivets may be delivered from the raceway singly in succession, suitable means are provided to feed the rivets one by one along the raceway toward its exit portion. In the illustrated form of the invention the said means comprises a slide bar 22 mounted in suitable guideways for reciprocating movement in the arm 20 and having projecting from each end portion thereof suitable clamps 23 to each of which is adjustably connected as by the set screws 24, a rivet separator 25. One of these separators, as indicated in Fig. 5, is disposed in a plane above the other, the construction being such that upon reciprocation of the separators in one direction, a rivet resting upon the upper separator will be permitted to drop upon the lower separator and, upon reciprocation of the separators in the reverse direction, the rivet now resting upon the top of the lower separator will be freed to pass to the lower end of the chute or raceway while the upper separator sustains the column of rivets extending upward in the raceway. The form of rivet separator shown and described constitutes a good embodiment of this feature of the invention and means are provided to impart the desired reciprocation thereto, said means comprising a slide 26 movable in vertical guideways in the arm 20 and carryng a pin 27 which projects into an inclined slot 28 in the slide bar 22. Some play may be permitted between the walls 28 and the pin 27, and a spring 29 secured to the arm 20 bears upon the end of the slide bar 22 to normally hold one wall of the slot 28 in yielding engagement with its actuating pin, the construction being such that should any obstruction be present in the separators as they are moved in one direction, the spring 29 would yield and prevent breakage of parts.

As a good, practical embodiment of this at the end of the raceway 18, the present invention contemplates that they shall pass into the control of a rivet holder and that such rivet holder shall be so constituted as to sustain the rivet in position for engagement by the transferring means which is to carry it to the slitting or slotting mechanism. Inasmuch as the transferrer, as will hereinafter more fully appear, is to snap over the rivet shank and then carry the rivet body from the holder for further treatment, the present invention forms the rivet holder in a plural number of relatively movable parts whereby, after the transferrer has grasped the rivet shank, a part of the rivet holder will move out of the way to permit the rivet to be carried by the transferrer into its subsequently desired position.

Figure 9:
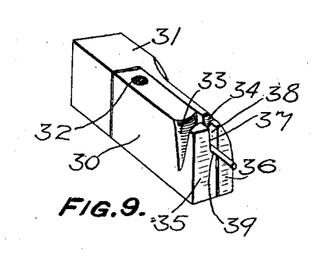
Fig. 9 is an enlarged detail of the rivet holder which receives the rivets singly from the raceway and presents them for the action of the transferrer.

As a good, practical embodiment of this feature of the invention, the holder comprises a fixed member 30, Fig. 9, and a movable member 31, which are provided with complemental rivet head engaging and holding recesses. The fixed member 30 of the rivet holder may be suitably secured to any fixed portion of the machine frame, and in the present instance of the invention it is so secured by means of an opening 32 through which a suitable set screw or other desired fastening means may be passed to connect the fixed member 30 of the rivet holder to the machine frame. The fixed member 30 of the rivet holder is provided at its front end portion with a rivet head receiving slot 33 properly rounded on its two opposing surfaces to accommodate a portion of the rivet head. Likewise, the movable member 31 of the rivet holder is similarly provided with a slot 34 adjacent its outer end and having suitably curved surfaces to form in connection with the opening 33 in the fixed member, a complemental rivet head holding slot. In order that the shank of the rivet may project beyond the faces 35 and 36 respectively of the fixed and movable members of the rivet holder, a suitable opening is provided for the rivet shank when the rivet head is contained within the slots 33, 34 of the rivet holder. In the present form of the invention, this opening is provided by cutting away a portion 37 of the fixed member of the rivet holder so that between the wall of the opening thus formed in the fixed member of the rivet holder and the side wall 38 of the movable member of the rivet holder is provided a suitable confining space or opening through which the shank of the rivet may project. Obviously, this shank opening for the rivet might be formed by otherwise constructing the relation of the end portions of the fixed and movable members of the rivet holder, but it is preferable that the fixed member be thus provided with the cutaway portion 37 in order to provide a shoulder 39 to support the rivet from the downward movement as the movable member of the rivet holder is moved downward, as will hereinafter appear.

Figure 7:
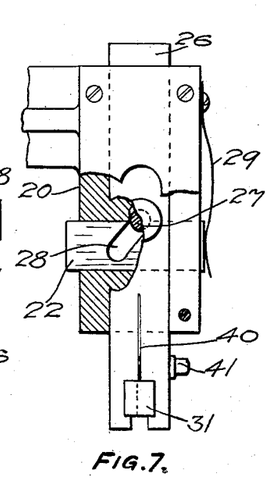
Fig. 7 is a rear view of the parts indicated in Fig. 5, showing some of the parts broken away to disclose others beyond.
Figure 8:
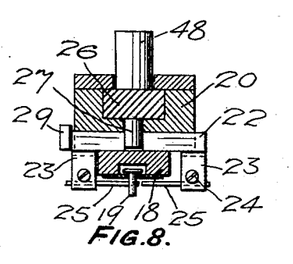
Fig. 8 is a section on the line 8—8, Fig. 5.

When the rivet has been delivered to the rivet holder and its head been received into the recesses 33, 34 of the fixed and movable members thereof, the present invention contemplates that the transferrer shall take the rivet from the rivet holder, and carry it forward for further treatment. To this end, the invention contemplates the provision of means for moving the movable member of the rivet holder out of the path of the rivet as prescribed by the transferrer when the latter takes the rivet from the holder and moves it toward the slitting mechanism. To this end the movable member 31 of the rivet holder is secured to the slide 26, hereinbefore referred-to, said slide being slotted as at 40 and recessed to receive the shank portion of the movable member 31 of the rivet holder, which may be removably secured thereto by suitable means such as the set screw or clamp 41, Fig. 7, the construction being such that after the rivet has been deposited in the holder from the raceway, when the transferrer has grasped the rivet to take it to the next station for treatment, the movable member of the rivet holder will be moved downwardly or out of the path of movement of the rivet as prescribed by the transferrer so that the rivet may be freely moved without obstruction.

The slide 26 may be appropriately driven through any convenient source from the main driving shaft, and as illustrated in the drawings, it is reciprocated by means of a lever 42, Fig. 2, pivotally mounted at 43 and having a roll 44 bearing upon the cam 45 secured to the main driving shaft and normally held thereagainst by means of a suitable spring such as 46, Fig. 2. The other end of the lever 42 is bifurcated, as indicated in Fig. 2 to engage a suitable block 47 in which is received the pin 48 projecting from the slide 26, a suitable slot 49 being provided in the arm 20 to permit reciprocating movement of the slide 26 and the pin 48 under the dictates of its cam 45.

Figure 10:
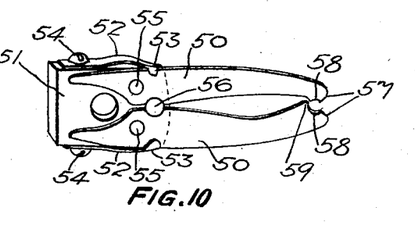
Fig. 10 is an enlarged detached detail showing a good practical form of transferrer for taking the rivets singly from the holder and presenting them for the action of other mechanisms to be described.
Figure 11:
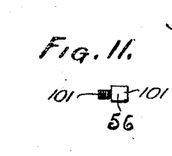
Fig. 11 is a view of the limiting stop.

The transferring mechanism for taking the rivet from the rivet holder and carrying it to the rivet slitting mechanism is of novel construction, and in the illustrated form thereof as indicated by Figs. 4 and 10, it comprises a pair of arms or fingers 50 carried by a reciprocating block 51 and normally held in the rivet grasping and moving position by yielding means such as the springs 52, one end 53 of each of which extends over the edge portion of the fingers 50 and another portion being secured as by the screw 54 to the block 51. In order that the fingers 50 may properly engage and release the rivet, they should be mounted upon the block 51 for relative movement and in the illustrated form of the invention, the fingers are each pivoted to the block 51 as at 55, the construction being such that the springs 52 will normally hold the fingers 50 with their rivet engaging end portions in operative relation. In order that this relation may be maintained and, if desired, adjusted from time to time in accordance with the size of rivets being treated, a suitable limiting stop 56 is provided which, as indicated in Figs. 10 and 11, is secured to the block 51 and is adapted to be engaged by each of the fingers 50 under the dictates of its spring 52. The stop 56 may be secured to the block 51 by screw threads 100, Fig. 11, or otherwise, and be provided with a head 101 of a size suitable for the size of rivet being treated.

The rivet engaging fingers 50 are, as above explained, normally held in the rivet grasping position; and in order that they may effectively and unerringly engage the rivet shank, hold the rivet between them, and then move it from the rivet holder to the rivet slitting mechanism, the end portions of the fingers 50 are peculiarly formed. In the illustrated form of the invention, each of the end portions of the fingers 50 is provided with an incline 57 which, as the fingers approach the rivet, are adapted to engage the shank thereof and ride over the same, thereby separating the end portion of the fingers 50 against the tension of their respective springs 52. In order that the fingers 50 may then effectively hold the rivet from dislodgment from between them, they are each provided with a recess 58 which effectively surrounds sufficient portions of the rivet shank to insure its positive control.

As hereinbefore noted, the office of the transferrer which in the illustrated form of the invention comprises the fingers 50, is to carry the rivet from the rivet holder to the rivet slitting mechanism or adjacent thereto, and such movement is preferably in the same direction as the transferrer movement in grasping the rivet. In other words, when the transferrer is moved to grasp or take control of the rivet, it first engages the rivet shank, pauses for a moment as will hereinafter appear, and then moves the rivet in the same direction as the transferrer's previous movement to carry it to the slitting mechanism. In order that the rivet may thus be unerringly moved, one of the rivet engaging fingers 50 is provided with a projection 59 which is adapted to engage the rivet on the side thereof opposite the direction of movement of the transferrer to thereby insure positive movement of the rivet to the slitting mechanism.

Suitable means may be provided to give to the rivet the desired movements which in the present form of the invention impart first an advancing movement to the transferrer to snap the ends of the fingers 50 about the rivet shank, then a slight pause to permit the movable member of the rivet holder to move out of the way and release the rivet, and then a further movement of the transferrer in the same direction. These desired movements may be imparted to the transferrer by any suitable mechanism, and in the present instance of the invention they are effected by means of a cam 60 mounted on the main shaft 4 and against which rides a roller 61 carried by an arm 62 projecting upward from a rod 63 to which is connected by means of a lug 64, a slide 65. Mounted upon the slide 65 is a carrier 66 to which the block 51 may be appropriately connected as by the screw 67, Fig. 4. The carrier 66 may preferably be mounted adjustably upon the slide 65 by means of a bolt 68 and may be moved to different positions of adjustment through suitable means, such as the adjusting screw 69, one end of which bears against a lug 70 on the slide 65 and the other end engages the carrier 66.

In order that the transferrer may be yieldingly reciprocated and in case of obstruction may "give" in order to prevent breakage of parts, it is moved toward the rivet engaging position and rivet delivering position by yielding means such as the spring 71 which may be appropriately placed upon the rod 63 and one end of which may bear against the projection 64 carried by the slide 65 and the other end of which may bear against a suitable seat 72 fixed to the machine frame.

From the construction described, it will be apparent that upon rotative movement of the main shaft the transferrer will be retracted by its cam into the position substantially indicated by Fig. 4; and upon further rotation of the main shaft the transferrer will be moved under the demands of the spring 71 yieldingly toward the rivet held by the rivet holder, will grasp the rivet, proceed to carry the rivet to position for action by the slitting mechanism, as will presently appear.

The slitting mechanism for providing the desired bifurcated portion in the rivet shank may be of appropriate character, and in the present form of the invention, comprises a guideway 73, Fig. 2, in which is reciprocally mounted the tool holder 74, Fig. 3, connected to one end of an actuating means such as the lever 75 pivotally mounted at 76 and connected at 17 with the arm 16 for actuation from the eccentric hereinbefore described as provided on the main shaft for actuating the pawl and ratchet mechanism for the hopper feed.

The slitting tool 77, Fig. 3, may be appropriately formed to provide the desired character of slot in the end portion of the rivet, and may be held to the reciprocating holder 74 by suitable means such, for instance, as the chuck 78 having a projecting portion extending through the slide to engage the elongated nut 79, the construction being such that the tool may be properly held in its seat in the reciprocating slide for accomplishing the slitting operation as usual in this class of machines.

Adjustably secured to the machine frame is the die block 80 having a suitably formed die for coöperation with the slitting tool. In the present form of the invention the die block is secured adjustably to the machine frame as by the bolts 81, Fig. 1, and by clamping or set screws 82$^x$, the construction being such in this respect that the die block may be adjusted to the appropriate position for coöperation with the rivet and slitting tool.

When the transferrer has taken a rivet from the rivet holder and transferred it to a position adjacent the die block 80, it is necessary that the rivet be then positioned on the die block, and to this end suitable means may be provided within the present form of the invention, comprising a plunger 82 carried by a slide 83 appropriately supported in guideways 84 on the machine frame, said slide 83 being adjustably secured to a link 85 carrying a pin or roll 86 engaging a slot 87 in a reciprocating part 88. The part 88 may be appropriately reciprocated from the main shaft by any suitable means, and as shown such means comprises a crank pin 89, Fig. 2, to which is connected the pitman 90, the opposite end of said pitman being connected to the slide 88, the construction being such that upon rotation of the main shaft, the member 88 will be appropriately reciprocated to move the plunger 82 to approach and engage a rivet when positioned by the transferrer opposite the die block, and as said plunger engages and moves the rivet toward and into the die-block transversely of the transferrer the distance between the head of the rivet and transferrer, where the rivet is held by said plunger, the transferrer withdraws therefrom.

The rivet now being in position for the slotting operation, the slitting tool 77 descends and cuts the end of the rivet shank, forming bifurcations therein and ejecting therefrom, it may be, the piece of the metal removed, which, as the slitting tool descends, is forced through the die block into the discharge passage 91, whereupon the slitting tool rises and leaves the rivet to the action of a suitable ejecting plunger 92. The ejecting plunger 92 may be appropriately operated through a slide 93, the end of which is pivoted at 94 to a lever 95 pivotally mounted at 96 to the machine frame and having its end portion at 97 in coöperative relation with a cam 98 on the main shaft, the construction being such that after the rivet has been slit and the slitting tool has passed from engagement with the rivet, the ejecting plunger 92 is moved to give the rivet its ejecting movement, whereby it is thrown into the discharge passage 99, from which it may be directed to a suitable receptacle.

What is claimed is: —

1. In a rivet slitting machine, the combination of a rivet slitting mechanism, a source of rivet supply, a rivet holder formed of a fixed member and a movable member having complemental rivet head receiving recesses, a transferrer and means for moving it in a straight path crosswise of said holder to engage the shank of a rivet held by said holder and carrying it for presentation to the slitting mechanism, and means for moving the movable member of the rivet holder to free the rivet therefrom when it is engaged by the transferrer.

2. In a rivet slitting machine, the combination of rivet slitting mechanism, a source of rivet supply, a rivet holder formed of a fixed member and a movable member, a transferrer movable crosswise past the end of the holder at substantially a right angle to the path of movement of the movable member for taking a rivet from said holder and carrying it for presentation to the slitting mechanism, means for moving the transferrer in a straight path at an angle crosswise of and beyond the holder, and means for moving the movable member of the rivet holder positively to free the rivet therefrom when it is engaged by the transferrer.

3. In a rivet slitting machine, the combination of rivet slitting mechanism, a rivet holder formed of a fixed rigid member and a movable rigid member having complemental rivet head receiving recesses and an opening for the rivet shank, a transferrer for taking hold of the projecting rivet shank held by the holder and moving the rivet to the slitting mechanism, means for reciprocating said transferrer in a rectilinear path transversely across the face of the holder, and means acting to move the movable rigid member of the holder across the path of the transferrer to free the rivet head and permit the rivet to move with the transferrer.

4. In a rivet slitting machine, the combination of a rivet slitting mechanism, a two part rivet holder comprising a fixed member and a rigid member movable in a vertical plane relatively thereto and each provided with complemental rivet head receiving recesses, one of said members having an opening through which the rivet shank may project, a transferrer, means for moving the transferrer in a path crossing the face of the holder and intersecting the rivet shank held by the holder, and means for moving the movable member of the holder from coöperating relation with the fixed member to permit the transferrer to carry the rivet transversely to one side of the holder.

5. In a rivet slitting machine, the combination of a slitting mechanism, a source of rivet supply, a rivet holder having a rivet head receiving recess to receive the rivet head singly from said supply, said rivet holder comprising a fixed member having a shouldered recess in its face to support the shank of a rivet the head of which is held by the holder, and a movable member having a face adapted to close and open said face recess in the fixed member to retain and then permit movement of the rivet laterally of the holder, and a transferrer movable in a straight path transversely of the holder for taking a rivet from the holder and transferring it for the action of the slitting mechanism.

6. In a rivet slitting machine, the combination of a slitting mechanism, a source of rivet supply, a rivet holder having a rivet head receiving recess to receive the rivet head singly from said supply, said rivet holder comprising a fixed member having a shouldered recess in its face to support the shank of a rivet the head of which is held by the holder, and a movable member, means for moving the movable member vertically away from the fixed member to permit a rivet to be moved laterally of the holder, a transferrer and means for moving the transferrer into engagement with the rivet shank, then stopping the transferrer until the movable member of the holder has released the rivet, and then continuing the transferrer movement in a straight path for taking the rivet from the holder and moving it for treatment by the slitting mechanism.

7. In a rivet slitting machine, the combination of rivet slitting mechanism, a two part rivet holder comprising a fixed and a movable member, a slide carrying the movable member, means for actuating the slide to lower the movable member from coöperating relation with the fixed member, a rectilinearly movable transferrer and means for moving the transferrer into engagement with the rivet shank, then stopping the transferrer until the movable member of the holder has released the rivet, and then continuing the transferrer movement in a straight path for moving a rivet laterally of the holder when the movable member is removed from coöperating relation with the fixed member.

8. In a rivet slitting machine, the combination of rivet slitting mechanism, a chute for feeding rivets, a rivet holder for receiving and holding in a fixed position a rivet at the base of the chute, a transferrer comprising relatively yielding fingers having reversely inclined rivet shank engaging end portions to snap over a rivet shank, means for moving the transferrer in a straight path toward the rivet held by the holder to engage the shank thereof and stop and then continue the transferrer movement in the same direction to carry the rivet toward the slitting mechanism.

9. In a rivet slitting machine, the combination of slitting mechanism, a rivet holder for holding a rivet in fixed position when received from a source of supply, and comprising a fixed rigid member and a movable rigid member, a transferrer having two yielding fingers each provided with oppositely inclined end portions to engage the shank of a rivet held by the holder, means for reciprocating the transferrer in a straight path to snap the ends of the fingers over the shank of the rivet while held by the holder, and means to positively move the movable member of the rivet holder to release a rivet and permit it to move bodily with the transferrer.

10. In a rivet slitting machine, the combination of slitting mechanism, a two part holder for supporting a rivet to be transferred to the slitting mechanism, a transferrer comprising a pair of relatively movable fingers having rivet shank engaging ends provided with inclined entrance portions to cause the shank of the rivet to separate the fingers and permit them to snap over the rivet shank as the transferrer is moved relatively to said holder, said fingers also having inclined rivet shank engaging portions to hold the rivet for movement with the transferrer and permit the rivet to be disengaged from the fingers when movement therewith is obstructed and a detachable stop between the spring fingers to limit their movement toward each other.

11. In a rivet slitting machine, the combination of a slide bar, a separator actuated by the slide bar, a rivet holder to receive and hold a rivet comprising a fixed rigid member and a movable rigid member connected to said slide bar, a transferrer, means for moving the transferrer into engagement with the rivet held by the holder and then stopping the transferrer movement, and means for moving the slide bar and movable rigid member of the holder to release the rivet when engaged by the transferrer, the transferrer moving means then acting to move the transferrer in a straight path past the fixed member of the holder.

12. In a rivet slitting machine, the combination of slitting mechanism movable in a plane transversely of the rivet shank, a holder comprising a fixed rigid member and a movable rigid member, a vertically movable slide bar carrying the movable member of the holder, a transferrer movable transversely across the face of the holder, means for moving the transferrer into engagement with the shank of the rivet held by the holder and then stopping the movement of the transferrer until the movable member of the holder has been moved from coöperative relation with the fixed member, and then continuing the movement of the transferrer in a straight path past the holder.

13. In a rivet slitting machine, the combination of slitting mechanism, a chute for supplying rivets, a rivet separator, a rivet holder comprising a fixed and a movable member, a slide bar, connections between the slide bar and separator and the slide bar and movable member of the holder for moving the separator and said movable member in planes at an angle to each other, a transferrer, and means for moving the transferrer transversely of the holder in a straight path to engage a rivet held by the holder, then stopping the transferrer while the movable member of the holder is moved by the slide to release the rivet, and then continuing the movement of the transferrer to carry the rivet to the slitting mechanism.

14. In a rivet slitting machine, the combination of slitting mechanism, a transferrer for taking a rivet from a source of supply and carrying it to the slitting mechanism, said transferrer comprising a block, a pair of fingers pivotally mounted thereon and having rivet engaging end portions to engage and snap over a rivet held in its path of movement, independent springs secured to the block and each acting separately upon one of said fingers to move the end portions of the fingers toward each other and permitting them to yield when they engage a rivet, a removable pin secured to the block between the fingers, and means for reciprocating said block.

15. In a rivet slitting machine, the combination of slitting mechanism, a transferrer for taking a rivet from a source of supply and carrying it to the slitting mechanism, said transferrer comprising a slide block, a pair of fingers pivotally mounted thereon and having rivet engaging end portions to engage and snap over a rivet held in its path of movement, springs having one end secured to the block and their other ends engaging said fingers to normally force them yieldingly toward each other and permitting them to yield when they engage a rivet, and means for reciprocating said block.

16. In a rivet slitting machine, the combination of rivet slitting mechanism, a chute for feeding rivets, a rivet holder for receiving and holding a rivet in fixed position at the base of the chute having yieldingly mounted fingers to snap over a rivet in the holder and carry it to one side thereof, a die block, a plunger to engage the rivet while held by the fingers and move it longitudinally into the die block and hold it, and means for reciprocating the transferrer to cause the fingers to snap over a rivet in the holder, carry it to a position in front of the plunger, and then retreat to automatically disengage the rivet held in the die block.

17. In a rivet slitting machine, the combination of a rivet holder comprising a fixed block and a movable block, each having an upwardly opening recess for the head of a rivet, a shoulder formed in the fixed block to support the shank of a rivet, means for positively moving the movable member vertically to release the rivet, a transferrer movable horizontally in a straight path past the end of the holder, means for causing the transferrer to engage the rivet, pause until the movable member of the holder releases the rivet and then continue in its transferring movement, and a slitting mechanism for slitting the end of the rivet.

In testimony whereof, I have signed my name to this specification, in the presence of two subscribing witnesses.

JAMES W. COOMBS.

Witnesses:
MARTHA C. SCOTT,
HERMAN DOPPELMAN.

Copies of this patent may be obtained for five cents each, by addressing the "Commissioner of Patents, Washington, D. C."